(12) United States Patent
LeBaron et al.

(10) Patent No.: US 6,195,826 B1
(45) Date of Patent: Mar. 6, 2001

(54) AIRCRAFT ENGAGEMENT ASSEMBLY FOR AIRCRAFT BOARDING BRIDGES

(75) Inventors: Gerald J. LeBaron, Fruit Heights; Bruce W. Anderson, Hooper, both of UT (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/322,483

(22) Filed: May 28, 1999

(51) Int. Cl.[7] .................................................. E01D 1/00
(52) U.S. Cl. ............................................. 14/71.5; 14/69.5
(58) Field of Search ................... 14/69.5, 71.1, 14/71.3, 71.5

(56) References Cited

U.S. PATENT DOCUMENTS

| | | |
|---|---|---|
| 2,688,761 | 9/1954 | Good, Jr. et al. . |
| 2,700,169 | 1/1955 | Henion . |
| 2,875,457 | 3/1959 | Read et al. . |
| 3,038,185 | 6/1962 | Moore . |
| 3,668,729 | 6/1972 | Mori et al. . |
| 3,703,737 | * 11/1972 | Eggert, Jr. ........................ 14/71.5 |
| 3,715,769 | 2/1973 | Mori et al. . |
| 3,835,651 | 9/1974 | Butterworth et al. . |
| 3,841,258 | 10/1974 | Odawara . |
| 4,161,049 | 7/1979 | Saunders et al. . |
| 4,293,967 | 10/1981 | Ord . |
| 4,319,376 | 3/1982 | Saunders . |
| 4,335,803 | 6/1982 | Sugita . |
| 4,553,720 | 11/1985 | Harder . |
| 4,601,253 | 7/1986 | Anders . |
| 4,971,510 | 11/1990 | Houle . |
| 4,984,321 | 1/1991 | Larson . |
| 5,033,392 | 7/1991 | Schemitsch . |
| 5,197,923 | 3/1993 | Barber . |
| 5,226,204 | 7/1993 | Schoenberger et al. . |
| 5,299,405 | 4/1994 | Thompson . |
| 5,328,252 | 7/1994 | Thompson . |
| 5,402,546 | 4/1995 | Baranowski . |
| 5,497,722 | 3/1996 | English, Sr. . |
| 5,632,357 | 5/1997 | Matre . |
| 5,761,757 | 6/1998 | Mitchell et al. . |
| 5,791,003 | 8/1998 | Streeter et al. . |
| 5,855,035 | 1/1999 | Streeter et al. . |

FOREIGN PATENT DOCUMENTS

| | | |
|---|---|---|
| 1531482 | 11/1969 | (DE) . |
| WO98 19910 | 5/1998 | (WO) . |

* cited by examiner

*Primary Examiner*—David Bagnell
*Assistant Examiner*—Gary S. Hartmann
(74) *Attorney, Agent, or Firm*—Trask Britt

(57) ABSTRACT

An engagement structure adapted for securement to the end of an aircraft boarding bridge includes a bumper assembly formed of a first bumper and an auxiliary bumper. The auxiliary bumper is mechanically associated with a drive assembly adapted for displacing the auxiliary bumper relative to the first bumper to provide a dimensionally adjustable floor area of a boarding bridge proximate the interface of the bridge and an aircraft serviced by the bridge. The engagement structure may also include bifurcated arrangement wherein a sliding floor element is associated with a length adjustable bumper subassembly. The engagement structure provides a structure whereby the floor structure of the boarding bridge can be opened to provide a passageway for an opening or closing aircraft door. The engagement structure further provides a structure whereby the floor may then be restructured to provide an embarkation platform which extends between the aircraft and the main structure of the boarding bridge which is of adequate dimension to permit the passage of passengers between the aircraft and the boarding bridge.

22 Claims, 5 Drawing Sheets

AIRCRAFT ENGAGEMENT ASSEMBLY FOR AIRCRAFT BOARDING BRIDGES

BACKGROUND OF THE INVENTION

Field: This invention relates to apparatus for use in servicing aircraft at airports. More specifically, the invention is directed to aircraft boarding bridges which are adapted for permitting egress from and ingress to an aircraft positioned adjacent to an airport terminal building.

Statement of the Art: Aircraft boarding bridges have become a commonplace phenomena at airport terminals both in this country and abroad. Such bridges provide a passageway for aircraft passengers and crew from the terminal building to an aircraft parked proximate to the terminal building. These bridges are highly valued for their ability to shelter aircraft passengers and crew from inclement weather as well as their ability to facilitate access to the aircraft for those having special needs, such as the disabled.

A reoccurring requirement encountered at airports is the need to provide boarding bridge access to a multiplicity of aircraft types. Given the existence of a number of aircraft manufacturers, each with their own particular aircraft doorway design and the lack of a standardized configuration for the entry way of an aircraft, airport service personnel are confronted on a daily basis with the need to provide an access way to a number of aircraft doorway configurations and orientations with a single boarding bridge assembly.

A primary example of this circumstance are the requirements posed by the door configurations typically found on large commercial aircraft verses the door configurations found on smaller commuter-type aircraft. In the case of the large commercial aircraft, the door is opened by means of a lateral displacement of the door panel, e.g. The door may open by pivoting about a vertical axis. Traditional boarding bridge constructions permit the aircraft door to be opened or closed, subsequent to the bridge being abutted against or docked up to the aircraft. The aircraft door is pivoted about its vertical axis through the open space found at the open end of the bridge until the door comes to rest against the side of the aircraft. Since the path of travel of the door is above the floor of the boarding bridge, the positioning of the boarding bridge floor against the sidewall of the aircraft does not impede the opening or closing of the aircraft door. Since the aircraft door does not come into contact with the floor structure of the boarding bridge during either the opening or closing procedure, boarding bridges have typically been constructed to define a planar floor element which is positioned elevationally below the door opening and positioned to extend outwardly from the doorway of the aircraft when the bridge is in a docked position.

In contrast, commuter aircraft oftentimes utilize a door assembly which pivots about a horizontal axis, positioned at the lower end of the door. In many instances, the door of a conventional commuter aircraft is fitted with a series of steps on its interior surface. In its open position the door defines a stairwell for accessing the aircraft or alternatively deplaning from the aircraft. The fact that commuter aircraft doors pivot about a horizontal axis creates a number of complications for the operator of a conventional boarding bridge structure which has been designed for use with aircraft having doors which pivot about a vertical axis. In those instances wherein a bridge is used to service a commuter aircraft, the bridge is conventionally brought into abutment against the aircraft fuselage prior to the opening of the aircraft door in order to shield the opening of the door from the environment. During the door opening procedure the operator of a conventionally constructed bridge is confronted with the problem of accommodating the downward passage of the door through an area presently occupied by the floor of the bridge. Assuming that some method is found to permit the opening of the door, the bridge operator is then faced with the challenge of providing a floor system between the aircraft and the main structure of the bridge It should be appreciated that aircraft boarding bridges seek to provide a passageway which is of considerable height above the surface of the underlying tarmac. Understandably, considerations of safety play a pivotal role in boarding bridge design. Changes in the configuration of the floor system of a boarding bridge, which are often mandated in transitioning from servicing an aircraft of one type to servicing an aircraft of a different configuration present a significant safety concern, in that adequate measures need to be taken to preclude passengers from inadvertently falling through openings in the floor system which may be created during any reconfirmation of the floor system.

Another concern faced by boarding bridge designers is the need to provide an engagement of the boarding bridge with the sidewall of the fuselage of the aircraft which minimizes the likelihood of damage to the aircraft fuselage. On the one hand, the engagement must provide a cover of the gap separating the aircraft from the main structure of the bridge sufficient to preclude a passenger from falling between the aircraft and the boarding bridge and thereby injuring himself or herself. On the other hand, the engagement cannot be so rigid that damage is done to the fuselage of the aircraft as a result of the engagement. Traditionally, boarding bridge designers have provided a bumper on the end of a boarding bridge as a means of providing an engagement of the bridge with the parked aircraft. This bumper serves not only to cover the gap existing between the aircraft and the main structure of the bridge, but furthermore, the bumper provides a structure of sufficient flexibility that the fuselage is spared from being damaged by the abutment of the bumper against the fuselage sidewall.

Providing an acceptable bumper structure for a boarding bridge is rendered difficult in view of the need to service a multiplicity of aircraft doorway configurations. While one bumper structure may be adequate for one particular aircraft doorway configuration, the same bumper may prove totally unworkable for the next aircraft to be serviced by the boarding bridge. In addition while the bumper structure must be sufficiently rigid to support the weight of passengers stepping on it as they enter or leave the aircraft, the bumper must also be sufficiently pliancy that it can comply with the fuselage of the aircraft without damaging that fuselage.

It follows that there presently exists a need for an engagement structure for a boarding bridge which at once addresses the need to provide a means of accommodating varied aircraft door constructions, particularly vertically pivoted doors and horizontally pivoting doors. Further, a need exists for an engagement structure adapted for providing a dimensionally adjustable floor system for the transition area between the aircraft and the main structure of the boarding bridge which likewise is suitable for use with both types of aircraft door structures. It is further recognized that such an engagement structure should minimize safety concerns and the likelihood of damage to the aircraft fuselage sidewall Such an engagement structure should provide flexibility and adaptability whereby the boarding bridge may be used to service aircraft having a variety of doorway constructions of various dimension, configuration, orientation and operation.

SUMMARY OF THE INVENTION

An aircraft engagement assembly adapted for use with an aircraft boarding bridge is disclosed. The assembly includes a first bumper which is adapted for securement to the main boarding bridge structure. The first bumper may be secured to the boarding bridge to remain stationary relative to the main body of the boarding bridge. The first bumper includes a first longitudinal axis. When the first bumper is secured to the main boarding bridge assembly, the first longitudinal axis of the bumper may be oriented transverse to the longitudinal axis of the boarding bridge, i.e., to that portion of the boarding bridge immediately adjacent to the securement of the engagement assembly.

A second or auxiliary bumper is positioned adjacent to the first bumper. In some configurations, the auxiliary bumper may be positioned within a channel defined within the structure of the first bumper. The auxiliary bumper is arranged to be displaced relative to the first bumper. Such displacement may be either manually or by means of a powered drive assembly. This displacement is preferably in a direction of travel which is parallel to the first longitudinal axis of the first bumper.

A drive assembly may be mechanically associated with the auxiliary bumper. The drive assembly is adapted to displace the auxiliary bumper relative to the first bumper thereby varying the total length of the bumper assembly formed by the first bumper and the auxiliary bumper. In preferred constructions, the drive assembly is adapted to displace the auxiliary bumper both away from the first bumper as well as toward the first bumper.

Both the first bumper and the second bumper define respective upper surfaces. Each upper surface defines a floor surface for passengers passing over the bumpers. Furthermore, each bumper. Includes a respective engagement face which is configured for engaging and otherwise abutting against the sidewall of the aircraft fuselage. The faces are constructed of materials of sufficient flexibility that damage to the aircraft sidewall is markedly reduced if not eliminated. The faces of the two bumpers are positioned in substantial lateral alignment, i.e., the forwardmost surfaces of the two faces are in a common vertical plane, or substantially in a common vertical plane.

As the auxiliary bumper is displaced outwardly from the first bumper, the area of floor surface defined by the two bumpers is dimensionally increased. Furthermore, the width of the bumper assembly as well as the length of the engagement of the assembly along the sidewall of the aircraft fuselage is extended. By adjusting the extent of the displacement of the auxiliary bumper relative to the first bumper, the user may provide an floor surface of any desired dimension within a defined range. By displacing the auxiliary bumper toward the first bumper, the operator of the boarding bridge may produce an opening in the floor structure of the bridge of sufficient dimension to accommodate the protruding platform which forms part of the deploying stair and handrail linkage of certain types of commuter aircraft. This protruding platform projects outwardly from the door seal of the fuselage. Once the door is in its fully opened position, the operator may then displace the auxiliary bumper away from the first bumper sufficiently to form a floor system over the space of the opening adequate to define a passage way or walking platform for passengers entering or leaving the aircraft. Accordingly, the instant invention provides a bumper assembly which is dimensionally adjustable depending on the nature and dimension of the aircraft door system to be serviced.

The engagement assembly may be a bifurcated assembly wherein the function of providing the principal displaceable floor system is provided by one element of the assembly while the function of providing the displaceable interface or bumper between the aircraft and the boarding bridge is accomplished by another element of the assembly which may be displaceable independently from the floor system. In a preferred embodiment, a single drive system may be employed to activate and drive both the displaceable floor system as well as the bumper system. In this preferred embodiment, the bumper is secured to the floor element by a detachable structure, e.g. an electromagnet, which retains the bumper in association with the floor until a contact switch associated with the bumper engages the stairway.

In one configuration, a slid able floor element is displace ably associated with a frame assembly. The frame assembly may also be secured to a width adjustable bumper assembly. The floor element is adapted for lateral displacement both away from and toward the fixed floor system of the boarding bridge, e.g., displacement in a direction transverse to the longitudinal axis of the boarding bridge. The displaceable floor element provides a platform structure which may be displaced toward the fixed floor system in order to create an opening in the floor of the boarding bridge dimensioned to accommodate the protruding platform of the stair and handrail linkage. The opening provides the operator of the boarding bridge with a clear view of the stairway, door and door platform of the aircraft and particularly commuter type aircraft as the cab of the boarding bridge is displaced toward the fuselage of the aircraft.

Alternatively, the floor element may be extended outwardly from the fixed floor system in order to define a floor system over the opening previously described. A bumper assembly is positioned adjacent to the slidable floor. The bumper assembly includes a principal bumper element which is secured to the boarding bridge structure preferably in a fixed, stationary condition. A secondary bumper is displaceably associated with the principal bumper element. The secondary bumper may be displaced toward the principal bumper to create an opening between the boarding bridge and the aircraft fuselage. Since the bumper may also define a portion of the floor of the boarding bridge, such a displacement would also create an opening in the floor of the bridge. This opening may be configured to accommodate the protruding platform of the handrail and stair linkage. This opening is also valuable in providing the operator of the boarding bridge with a clear view of the stairway, door and door platform of the aircraft as the cab of the boarding bridge approaches the aircraft fuselage during the docking procedure.

The association of the opening created by the displacement of the floor element and the opening created by the displacement of the bumper assembly forms a passageway of sufficient dimension to accommodate the protruding platform often found on commuter type aircraft which platform forms part of the deployable air stair. A displacement of the secondary bumper away from the principal bumper and a displacement of the floor element may be adopted to close the aforesaid passageway created by the displacement of the bumper and the floor element. These latter displacements further provide a floor structure between the boarding bridge and the aircraft of sufficient dimension to permit the passage of passengers there over into and out of the aircraft.

Accordingly, the floor element provides the user with a means of providing a dimensionally adjustable embarkation platform adjacent to the bumper assembly, while the adjustable bumper assembly provides not only a dimensionally adjustable secondary embarkation platform, the adjustable bumper assembly also provides a means of adjusting the extent of the interface between the bridge and the fuselage of the aircraft. As may be appreciated, the floor element and the bumper assembly may each be displaced, either independently or jointly, a predetermined distance to accommodate the individual opening and closing requirements of a multiplicity of aircraft door configurations, dimensions, orientations and operational characteristics on an individualized basis.

The floor element may be disposed adjacent to the bumper assembly. Furthermore, the floor element may be arranged to operate independently of the bumper assembly or alternatively the floor element may be detachably associated with the bumper assembly. In this latter construction, the displacement of the secondary bumper would effect a similar displacement of the floor element and vice versa.

The invention therefore provides a construction whereby the floor of the boarding bridge may be reconfigured to define a passageway there through dimensioned to accommodate the platform of commuter type aircraft during its opening or closing procedure. The floor may then be reconfirmed to define an embarkation platform of sufficient dimension, adjacent to the open doorway of the aircraft, to provide for the passage there over of passengers and crew entering or leaving the aircraft. By adjusting the lateral extension or displacement of the secondary bumper and the floor element, the engagement structure can be configured in an infinite number of lengths to accommodate a multiplicity of doorway widths, door configurations and door operational characteristics.

DETAILED DESCRIPTION OF THE INVENTION

Figure 1:
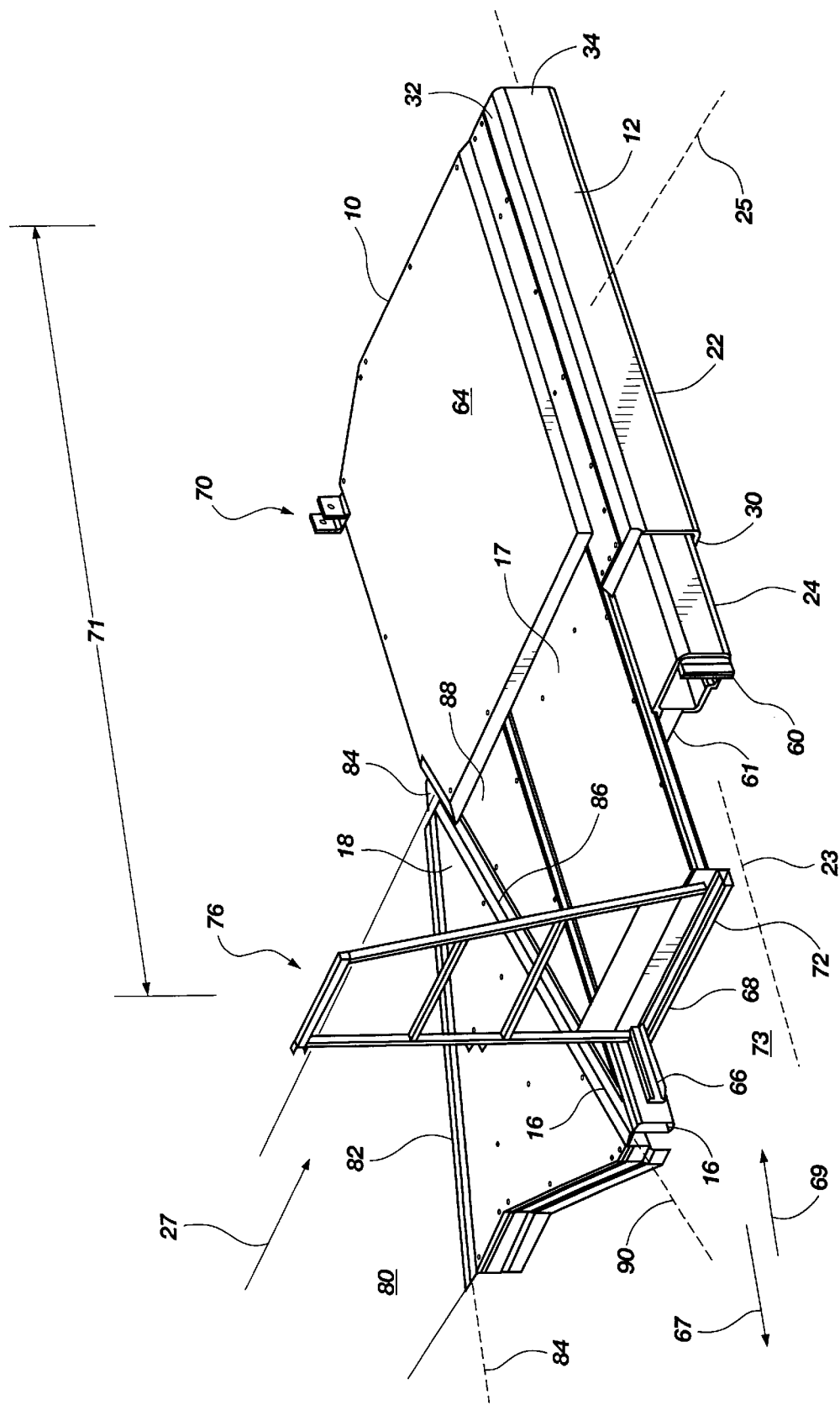
FIG. 1 is an elevated perspective view of an engagement assembly of the instant invention.
Figure 2:
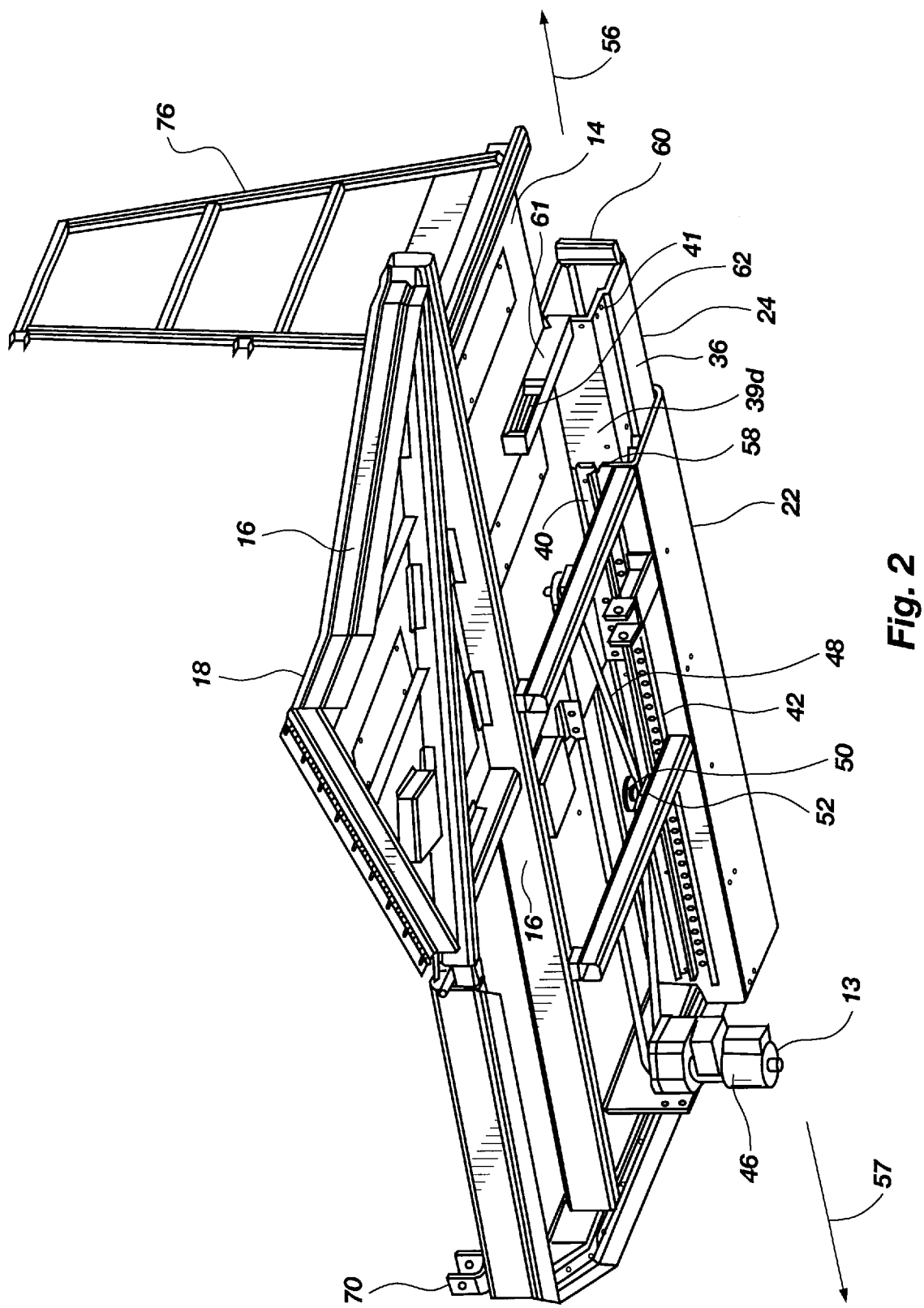
FIG. 2 is a bottom perspective view of the engagement assembly shown in FIG. 1.

As shown in FIGS. 1 and 2 the engagement assembly 10 of the instant invention may include a bumper assembly 12 in association with a drive assembly 13. The bumper assembly may be formed of a first bumper 22 and a secondary or auxiliary bumper 24. The bumper assembly 12 is shown secured to a frame assembly 16 which includes a floor assembly 17. The frame assembly 17 is adapted for securement to the main structure of a boarding bridge.

The Bumper Assembly

As illustrated, the bumper assembly 12 is formed principally of two elements, a first bumper 22 and an auxiliary bumper 24. The first bumper is generally elongate in configuration and may be viewed as being a "U"-shaped cross sectioned element formed of three planar elements 32, 34, and 36. The element 32 defines a floor surface for the engagement assembly and hence for the bridge itself. Each of the three elements or panels is secured to the panel adjacent thereto along a longitudinal edge of the panel to form a right angle. The association of the three panels defines a three sided, generally box-like structure having a longitudinal axis 23. The three panel construction defines an open side 38, which extends along a length of the construction. The first bumper 22 defines a channel 30 which extends through a length of the bumper. The channel 30 communicates with the environment through an open end as well as through the open side 38. Secured on the upper surface of the bottom panel 36 is an elongate guide track 31. The guide track 31 extends through the channel 30 and is generally linear in configuration. Secured to the outer surface of the panel 34 is the face 37 of the bumper. The face 37 is preferably fabricated of a material of sufficient flexibility that an abutment of the face 37 against the sidewall of the fuselage of an aircraft will not result in damage being rendered to the aircraft. The face of the bumper may be fabricated of a soft rubber or a synthetic rubber material. The face 37 extends along the complete length of the first bumper 22 and forms the engagement or abutment surface for the bumper against the aircraft fuselage.

The auxiliary bumper 24 of the bumper assembly 12 is similar in construction to the first bumper with the exception that the auxiliary bumper 24 includes four panels in its construction as opposed to three. The fourth panel is placed in the position of the open side in the first bumper construction. The auxiliary bumper 24 is therefore formed by four panels 39A, 39B, 39C and 39D. As previously indicated in the description of the first bumper element 22, the conjunction of the panels forms a box-like construction. The bottom panel, 39C defines a channel 41 on its lower surface which is configured to slidably accept the guide track 31 which is mounted on the upper surface of panel 36. The channel 41 extends along the length of the auxiliary bumper 24. The upper surface 39A defines a floor surface for the engagement assembly and hence for the boarding bridge.

A rack gear 42 is secured to the exterior surface of the panel 39D. The rack gear 42 extends along the length of the auxiliary bumper 24. As shown the auxiliary bumper 24 is dimensioned so as to be slidably received within the channel 30 of the first bumper whereby the longitudinal axis 43 of the auxiliary bumper 24 is oriented to be co-linear with the longitudinal axis 23 of the first bumper 22.

The end of the auxiliary bumper 24 is fitted with a sensing switch 60 which is adapted to interrupt power to the drive assembly 13 upon the switch's abutment against an object positioned within the path of the auxiliary bumper's displacement.

A laterally extending support structure 61 extends outwardly from the auxiliary bumper 24. Mounted on the structure 61 is a magnet 62, which is preferably an electromagnet.

Once positioned within the channel 30 of the first bumper 22, the auxiliary bumper 24 presents the rack gear 42 through the open side of the first bumper construction. The rack gear 42 is mechanically associated with the drive assembly 13. As shown in FIG. 2, the drive assembly 13 includes a motor 46 which includes a pulley drive gear. A drive belt 48 is trained about the pulley drive gear and a secondary pulley 49. Lastly, the drive belt 48 is also trained about a tensioning sprocket 50. The sprocket 50 is interconnected to a pinion gear 52 which is in register with the teeth of the rack gear 42. As the motor turns the drive belt is driven in one of two possible directions. Rotation of the motor in a first direction causes the drive belt to cause the pinion gear to drive the rack gear, and as a result the auxiliary bumper 24, in the direction 56. Rotation of the motor in the opposite direction causes the rack gear, and as a result, the auxiliary bumper, to be driven in the direction indicated by arrow 57. Suitable control means for controlling the speed as well as the direction of rotation of the motor (not shown) are associated with the drive motor to facilitate the operator's being able to control the displacement of the auxiliary bumper relative to the first bumper. The first bumper 22 is fixedly secured to the frame 16 so that as the pinion gear intercooperates with the rack gear 42, the auxiliary bumper 24 will reciprocate within the channel 31.

The Floor Assembly

Figure 3:
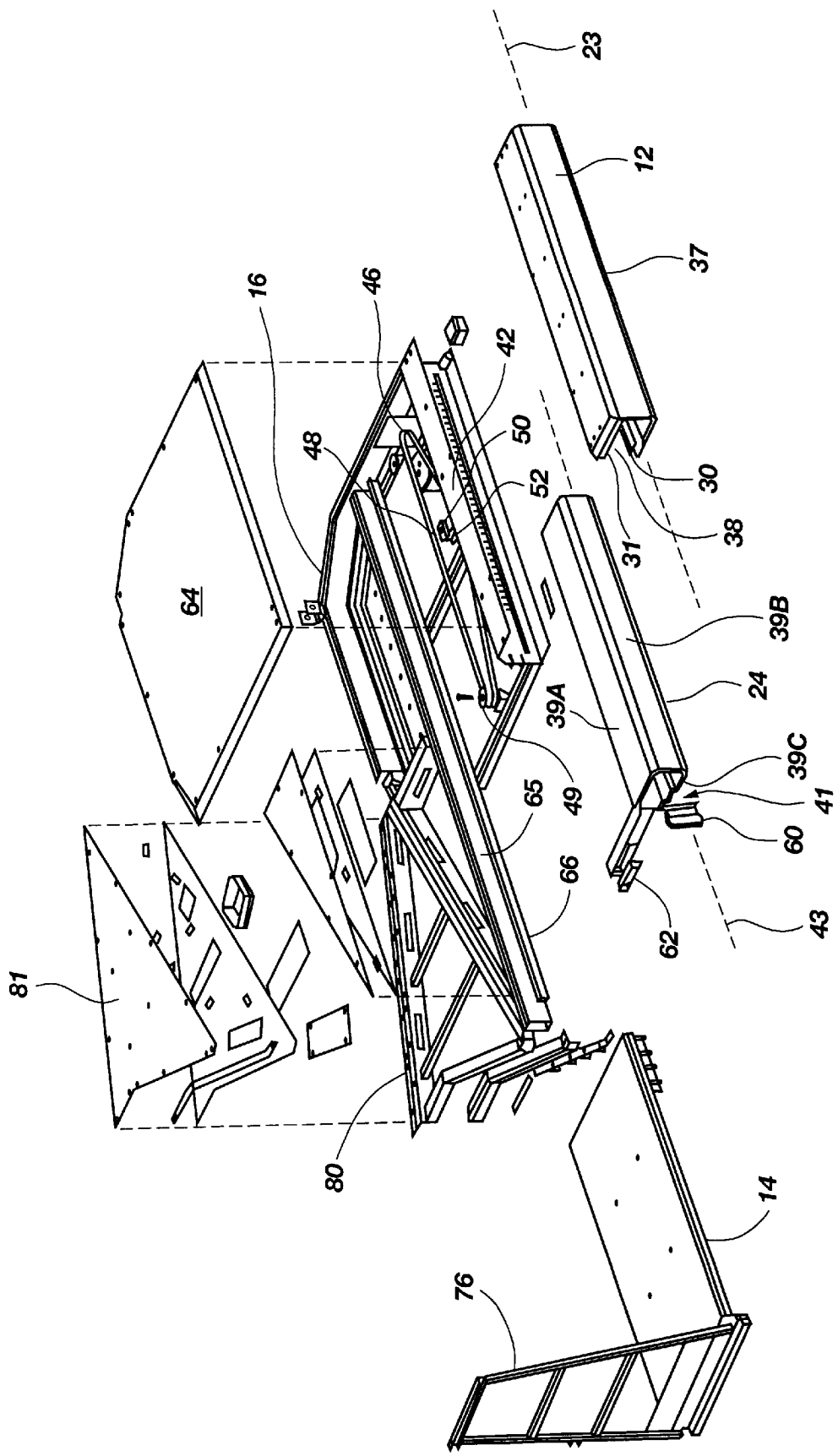
FIG. 3 is an exploded view of the engagement assembly.
Figure 4:
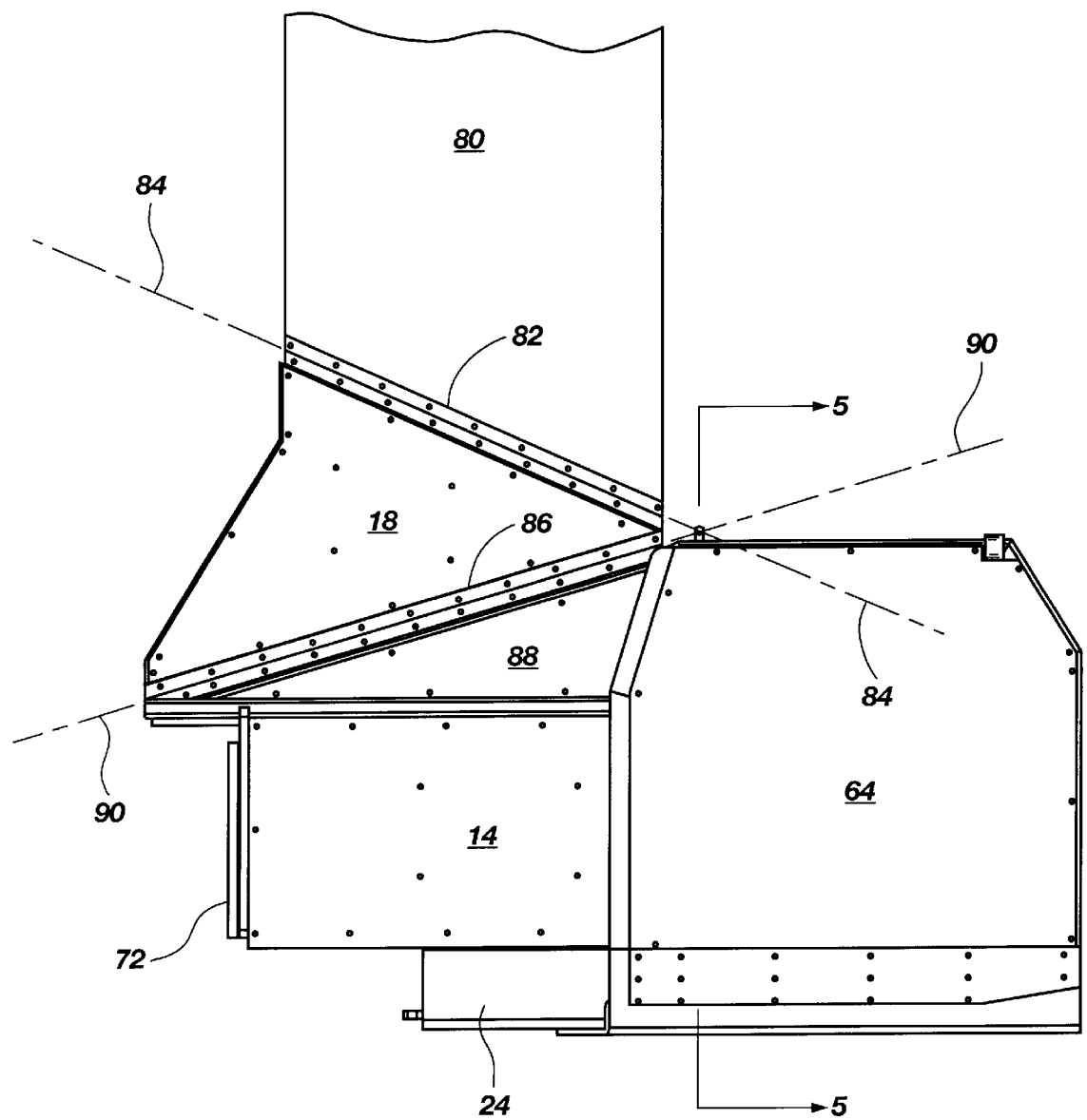
FIG. 4 is a top plan sectional view of the boarding bridge floor arrangement.
Figure 5:
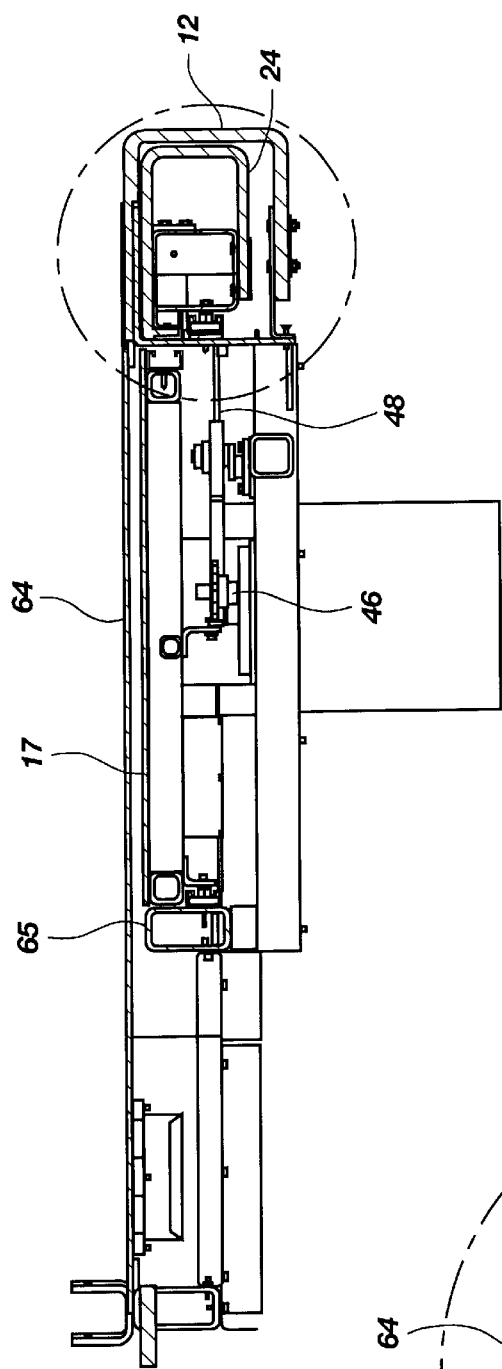
FIG. 5 is a cross sectional view of the floor arrangement of FIG. 4 taken along section line 5—5.
Figure 6:
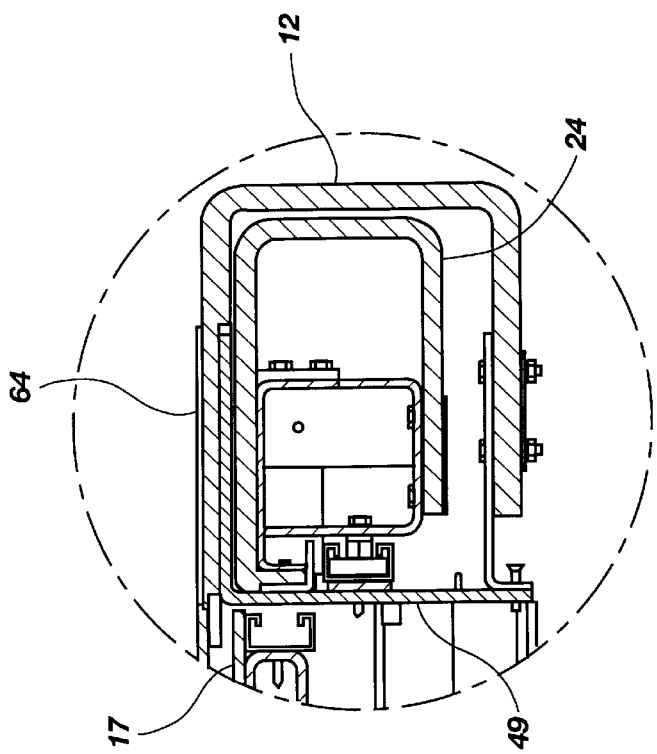
FIG. 6 is an enlarged view of a portion of the floor arrangement of FIG. 5.

As shown to advantage in FIGS. 2 and 3, the frame 16 includes a number of structural beams which are arranged to define a framework suitable for supporting the floor elements 64, 17 and 18 as well as the bumper assembly 12. The upper surface of the frame assembly provides a level support for the mounting of the stationary floor panel 64. The panel 64 constitutes the principal embarkment platform for the boarding bridge. The panel 64 is fixedly secured to the frame 16. Frame beam 65 is an elongate beam which is positioned such that its longitudinal axis extends parallel to the longitudinal axis 23 of the first bumper 22. Secured to the upstanding face of the beam 65 is an elongate track element 66. The frame 16 defines a second beam spaced parallel from the beam 65. The two beams in association define a track structure which slidably receives a floor element 17 whereby the element 17 is permitted to slide longitudinally along the track element 66. The floor element 17 is positioned elevationally below the plane of the floor panel 64. This positioning permits the floor element 17 to slide underneath the panel 64. The floor panel 17 is adapted for displacement both away from the panel 64, along the direction indicated by directional arrow 67 as well as toward the panel 64 along the direction of directional arrow 69. Both of these directional arrows are oriented transverse of the longitudinal axis 27 of the boarding bridge. By adjusting the length of displacement of the floor element 17 along the track 66, the user may adjust the length 71 and area of the flooring platform defined by the two panels 64 and 17. As a result the user may adjust the width of the floor element to create an opening in the floor structure of sufficient dimension to accommodate the platform of a commuter type aircraft while the boarding bridge structure is docked against the fuselage of the aircraft. The width may be adjusted to cover such any gaps between the floor structure of the boarding bridge and the aircraft thereby creating an embarkation platform adjacent the doorway of an aircraft of sufficient area to permit the entry of passenger and crew into the aircraft or alternatively the deplaning of the aircraft.

The end of the floor element 17 is fitted with an upstanding rail assembly which functions to restrict passenger access to the area 73 to the left of the rail. The floor element may be positioned either manually or by means of the drive assembly. The rail assembly may be used as a means of facilitating the manual pulling or pushing of the floor element into position.

The magnet 62 may be operated to detachable interconnect the floor element 17 with the auxiliary bumper 24 so that any displacement of the auxiliary bumper by means of the drive assembly 13 results in an equivalent displacement of the floor element 17. The interconnection of the auxiliary bumper 24 with the floor element 17 permits both structures to be displaced and otherwise operated by means of a single drive mechanism.

A floor level apparatus 70 may be associated with the frame 16 for purposes of permitting the leveling of the floor assembly. In a preferred construction of the invention, the floor structure of the boarding bridge in or proximate the cab includes an articulated cab floor. As shown in FIG. 1, a generally triangularly shaped section 18 of the floor assembly is interconnected to the floor 80 of the boarding bridge by an elongate hinge 82 which extends along a first edge of the section 18. This hinge 82 permits a rotation of the section 18 about the generally horizontal axis 84. The floor section 18 is interconnected on a second side thereof with the cab floor section 88 by means of an elongate hinge 86 which extends along a length of the second side of the floor section 18. This second hinge 86 permits a rotation of the floor section 18 about the axis 90. As the elevation and orientation of the boarding bridge and the cab of that bridge are adjusted, oftentimes independent of one another, the articulated cab floor structure rotates about the two axes, namely axis 84 and axis 90 thereby providing a transitional walking surface between the floor 80 of the main boarding bridge structure and the floor section 88 of the cab. Floor section 88 is fixedly secured to the frame assembly 17.

Characteristics of the described and illustrated embodiments are intended for illustrative purposes and are not to be considered limiting or restrictive. It is to be understood that various adaptations and modifications may be made by those skilled in the art to the embodiments illustrated herein, without departing from the spirit and scope of the invention, as defined by the following claims thereof.

What is claimed is:

1. An aircraft engagement assembly for an aircraft boarding bridge, said assembly comprising:

a first bumper adapted for securement to said aircraft boarding bridge; said first bumper having a longitudinal axis which is positioned transverse to a longitudinal axis of said aircraft boarding bridge upon a securement of said first bumper to said aircraft boarding bridge; and an auxiliary bumper, positioned adjacent said first bumper for sliding displacement relative to said first bumper along a first direction of travel parallel to said longitudinal axis of said first bumper;

wherein said first bumper and said auxiliary bumper each include a floor forming surface.

2. The engagement assembly of claim 1 further comprising a drive assembly mechanically associated with said auxiliary bumper for displacing said auxiliary bumper along a first direction of travel parallel to said longitudinal axis of said first bumper.

3. The engagement assembly of claim 1 further comprising a frame, said first bumper being secured to said frame.

4. The engagement assembly of claim 3 further comprising an auxiliary floor element mechanically associated with said frame for displacement along said frame.

5. The engagement assembly of claim 4 wherein said auxiliary floor element is associated with said frame for displacement along a second direction of travel parallel to said first direction of travel.

6. The engagement assembly of claim 4 further comprising a securement structure for securing said auxiliary floor element to said auxiliary bumper.

7. The engagement assembly of claim 6 wherein said securement structure is adapted for detachable securing said auxiliary floor to said auxiliary bumper.

8. The engagement assembly of claim 7 further including a drive assembly mechanically associated with said auxiliary bumper, said drive assembly being operable to displace both said auxiliary bumper and said auxiliary floor.

9. The engagement assembly of claim 6 wherein said securement structure is a magnet secured to said auxiliary bumper for securing said auxiliary bumper to said auxiliary floor element.

10. The engagement assembly of claim 9 wherein said magnet is an electromagnet.

11. The engagement assembly of claim 10 further comprising a tensioning sprocket assembly mechanically associated with a drive belt.

12. The engagement assembly of claim 9 further comprising a locking assembly for securing said auxiliary bumper to said auxiliary floor element upon disengagement of said magnet.

13. The engagement assembly of claim 1 wherein said auxiliary bumper is disposed within an open-ended channel defined within said first bumper.

14. The engagement assembly of claim 13 wherein said first direction of travel is co-linear with said longitudinal axis of said first bumper.

15. The engagement assembly of claim 1 wherein said drive assembly comprises:
   a motor;
   a drive belt mechanically associated with said motor;
   a pinion gear assembly mechanically associated with said drive belt; and
   a rack gear mechanically associated with said pinion gear assembly, said rack gear assembly being secured to said auxiliary floor element.

16. The engagement assembly of claim 1 further comprising an upstanding rail assembly secured to said auxiliary floor element.

17. The engagement assembly of claim 16 further including a frame, said first bumper being displaceably secured to said frame and said auxiliary floor element being mechanically associated with said frame for a sliding displacement therealong.

18. The engagement assembly of claim 17 further including an articulated floor assembly mechanically associated with said frame.

19. The engagement assembly of claim 1 further comprising a safety switch secured to said auxiliary bumper proximate an end thereof for terminating a displacement of said auxiliary bumper.

20. An aircraft engagement assembly for an aircraft boarding bridge, said assembly comprising:
   a first bumper adapted for securement to said aircraft boarding bridge; said first bumper defining a face configured for engaging a sidewall of an aircraft fuselage;
   an auxiliary bumper mechanically associated with said first bumper adapted for displacement outwardly from said first bumper, said auxiliary bumper having a face element for engaging said sidewall of said aircraft fuselage;
   an auxiliary floor element disposed for displacement relative to a floor of said aircraft boarding bridge, said auxiliary floor element being detachable interconnected with said auxiliary bumper; and
   a drive assembly mechanically associated with said auxiliary bumper for displacing said auxiliary bumper outwardly from first bumper together with said auxiliary floor.

21. The aircraft engagement assembly of claim 20 wherein said auxiliary floor element is detachably interconnected with said auxiliary bumper by means of an electromagnet.

22. The aircraft engagement assembly of claim 20 wherein said auxiliary bumper is oriented such that said face of said auxiliary bumper is substantially aligned with said face of said first bumper whereby a displacement of said auxiliary bumper relative to said first bumper retains said faces in alignment along a common axis.

* * * * *